Feb. 11, 1969   G. J. CONSTANTIKES ET AL   3,427,228
PREVENTION OF FLOODING IN A DISTILLATION COLUMN
BY CONTROL OF COLUMN TOP PRESSURE
Filed Dec. 27, 1965
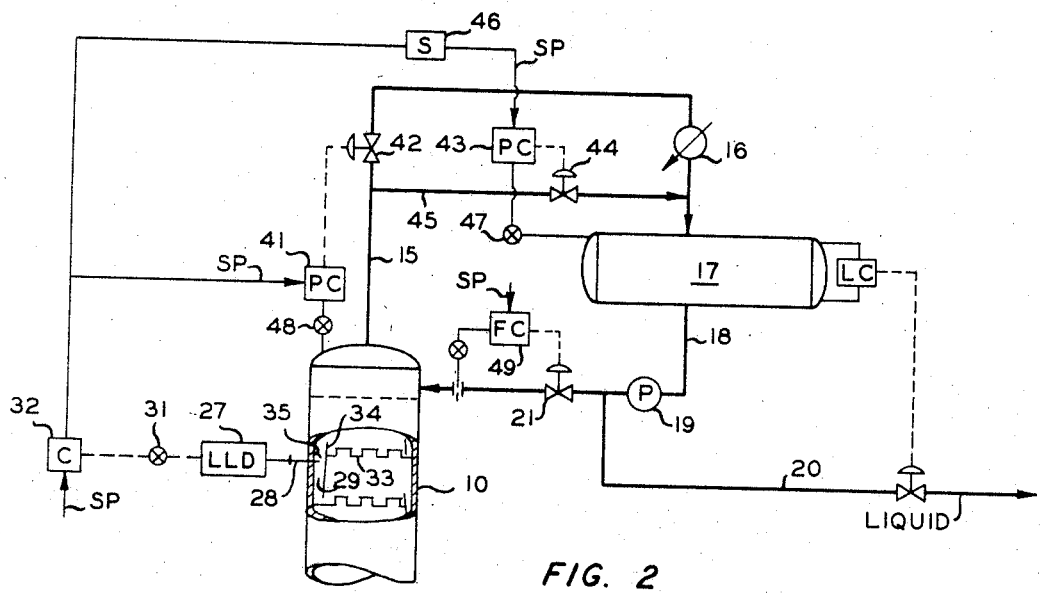
FIG. 2
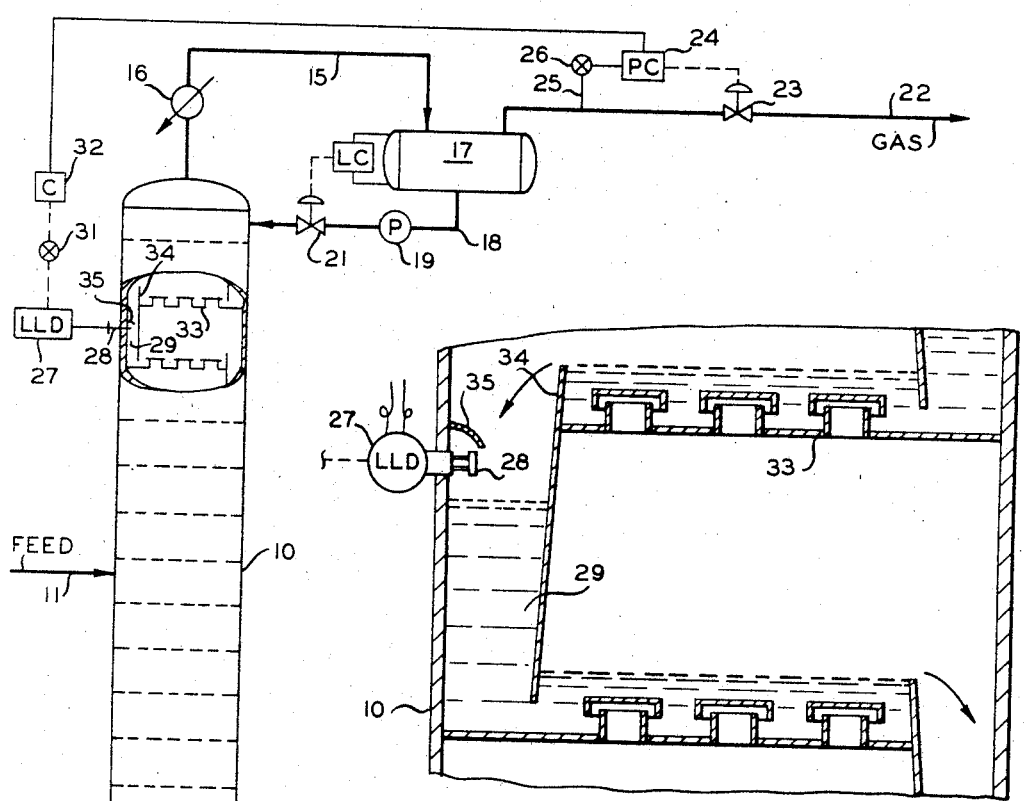
FIG. 1
FIG. 3
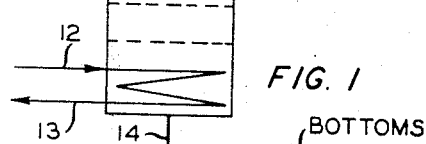
INVENTORS
G. J. CONSTANTIKES
R. D. BAUER
BY *Young and Quigg*
ATTORNEYS { # United States Patent Office

3,427,228
Patented Feb. 11, 1969

3,427,228
PREVENTION OF FLOODING IN A DISTILLATION COLUMN BY CONTROL OF COLUMN TOP PRESSURE
George J. Constantikes and Robert D. Bauer, Bartlesville, Okla., assignors to Phillips Petroleum Company, a corporation of Delaware
Filed Dec. 27, 1965, Ser. No. 516,482
U.S. Cl. 203—1            7 Claims
Int. Cl. B01d 3/42

ABSTRACT OF THE DISCLOSURE

Incipient flooding in a distillation column is detected as a liquid level in a downspout or downcomer and the condition that is tending to produce flooding is corrected by reducing the pressure on the distillation column.

---

This invention relates to a method and means for preventing flooding in a distillation column. In one aspect this invention relates to a method and means for detecting and correcting conditions which cause flooding in a distillation column.

In a distillation process wherein components of a mixture are separated by vaporization and removal of a component or components of the mixture, conditions sometimes obtain such that the distillation apparatus fills with liquid and the distillation process ceases. This condition is well known and can occur in any distillation process. Large scale, precise separations are usually conducted in a multi-tray distillation column commonly referred to as a fractionator wherein openings through the trays, called chimneys, are covered by a bubble cap to allow vapor to pass upward through the tray and prevent flow of liquid downwardly through the tray. A downspout passageway is provided at one side of the tray and a weir extends above the downspout to maintain a predetermined level of liquid on the tray. The weir and downspout assemblies are usually positioned on alternate sides of the trays so that liquid flows down through a downspout, across a tray and down through the next downspout on the opposite side of the column. The pressure differential from the bottom of the column to the top must be such that the vapor will pass upwardly through the bubble cap and the liquid on the bubble tray. In order for the liquid on the tray to pass through the downspout to the tray below there must be a liquid head in the downspout above the liquid on the tray below sufficient to balance the presusre differential producing the vapor flow and, in addition, to produce liquid flow through the downspout. The first observable effect of exceeding the liquid capacity of a column is an increase in the quantity of liquid on the trays and in the downspouts. When the downspout becomes filled with liquid, any slight increase in liquid or vapor flow increases the level of liquid on the tray. The increase in liquid level on the tray increases the pressure differential across the tray which, in turn, causes more liquid to back up through the downspout, producing a further increase in the liquid level on the tray. The result of this accumulative cycle is that the column fills with liquid and ceases to function as a distillation apparatus. Flooding will not occur as long as there exists some free space between the level of the liquid in the downspout and the level of liquid on the tray above.

Various techniques have been proposed and practiced for preventing flooding of a distillation column. Such proposals, including reducing the heat to the column and reducing the feed to the column, have not been successful because such methods reduce production and require an undesirable length of time in returning the column to normal operation.

We have discovered that incipient flooding of a distillation column can be detected by determining an increase in the liquid level in a downspout and that the state or condition that is tending to produce flooding can be corrected by reducing the pressure on the column. The response to a reduction in pressure on a flooding or flooded column is quite rapid and the flooding condition can be corrected rapidly without impairing the production of the column.

It is an object of this invention to provide a method and means for detecting incipient flooding in a distillation column. It is also an object of this invention to provide a method and means for correcting the condition of flooding in a distillation column quickly and without loss of production. Still another object of this invention is to provide a method and means for operating a distillation column at optimum capacity. Other and further objects and advantages of this invention will be apparent to one skilled in the art upon reading this disclosure including the detailed description of the invention and the appended drawing wherein:

FIGURE 1 is a schematic illustration of a distillation column operated according to the invention where the overhead product is recovered as a vapor;

FIGURE 2 is a schematic illustration of a distillation column operated according to the invention where the overhead product is removed as a liquid; and FIGURE 3 is an illustration, in cross section, of a portion of a distillation column operated according to the process of the invention.

Referring now to the drawing and particularly to FIGURE 1, a distillation column 10 is illustrated wherein a feed stream, such as a mixture of methane, ethane, and possibly a small amount of higher boiling hydrocarbon such as propane, is introduced as feed to the column via conduit 11. The kettle of the column is reboiled by a heater in the bottom of the column such as steam introduced via conduit 12 and removed via conduit 13. A bottoms product comprising ethane and any heavier hydrocarbons is removed via conduit 14. Methane product is removed overhead from column 10 via conduit 15, is partially condensed in condenser 16 and passed to accumulator 17 wherein a level of liquid is maintained. Liquid is passed via conduit 18, pump 19 and valve 21 into the top of column 10 as reflux. Methane product is removed from accumulator 17 via conduit 22. Conduit 22 contains valve 23 operated by pressure controller 24 which maintains a predetermined back pressure on column 10 as dictated by the set point with respect to the pressure in column 10 as determined by pressure tap 25 and pressure transmitter 26.

A liquid level detector 27 having a sensing element 28 projecting into the downspout 29 of column 10 detects the presence of a liquid level at a predetermined locus in downspout 29 and transmits a signal indicating the presence of such liquid level via transmitter 31 to controller 32. Controller 32 then resets controller 24 at some predetermined lower level so that the opening through valve 23 is increased and the back pressure maintained on column 10 is decreased.

The sensing element or probe 28 is protected from the flow of liquid from tray 33 over weir 34 by means of a baffle indicated at 35. The column will continue to operate at the new lower pressure until the set point on pressure controller 24 is reset to some higher pressure manually.

The column illustrated in FIGURE 2 can be column 10 of FIGURE 1 operated to remove a liquid product instead of a vapor product and therefore elements common to FIGURES 1 and 2 have the same designating numerals. In column 10 of FIGURE 2 the feed can comprise a mixture of hydrocarbons such as propane and butanes with the bottoms product being the butanes and the overhead product being liquid propane. When the detector 27 transmits a signal to controller 32 indicating incipient flooding, represented by a high liquid level in downcomer 29, controller 32 resets controller 41 at a lower pressure, thus passing more material through conduit 15 and condenser 16 by opening valve 42 to pass more fluid. Controller 32 also resets controller 43 to pinch down on valve 44 and to by-pass a smaller amount of material around condenser 16 via conduit 45. A subtracting instrument 46 maintains the set point of controller 43 at some value lower than the set point of controller 41 so that the pressure transmitted from accumulator 17 to controller 43 via transmitter 47 is at a predetermined value lower than the pressure transmitted from column 10 to pressure controller 41 via transmitter 48. Flow controller 49 is set to pass a substantially constant amount of reflux from accumulator 17 to column 10 in FIGURE 2 whereas valve 21 of FIGURE 1 is controlled by a liquid level controller on accumulator 17.

FIGURE 3 shows in greater detail the relationship of the liquid level detecter to the elements in the column. The liquid level detector can be any instrument capable of determining the presence of a liquid level at a preselected point in the downcomer and such instruments are commercially available, for example, the Dynatrol,[1] an instrument available from Automation Products, Inc., Houston, Texas.

In some separation systems flooding of the column will tend to start in the upper part of the column and in other systems flooding will tend to start in the lower part of the column. The operator of any column will usually know whether a flood will start in the upper or lower part of the column. The location of a flooded section of a column can be determined by the temperature profile through the column. When a distillation column has a flooded section therein, the temperatures within that section tend to merge together and to be the same. The liquid level sensing means will advantageously be placed in a downcomer in that section of the column where flooding is known to start. When a flooded condition in a fractionating column starts, the yield of products from the column rapidly drops off and the inventory within the column builds up.

The following specific example will be helpful in attaining an understanding of the invention; however, it is intended that the example be illustrative of the invention and not unduly limiting.

EXAMPLE

In a demethanizing column operated at a bottom column pressure of about 390 p.s.i. wherein flooding conditions had occurred, practice of the invention has successfully prevented column flooding and permitted an increase in the feed to the column of about 14 percent by lowering the column pressure from 390 to 340 p.s.i. Continued practice of the invention has permitted a further decrease of bottom column pressure to 316 p.s.i. with a corresponding increase in the feed to the column. Thus practice of the invention has increased the capacity of this distillation column and allows the column to be operated at a substantially lower pressure. The quality of the products has not been affected by this change in operation. Practice of the present invention permits the column to be operated at maximum capacity while at the same time allowing no flooding in the column.

Typical plant operations as applied to a demethanizer and a depropanizer are shown in the following table compared to the column pressure and feed prior to practice of the invention.

[1] A trademark.

| Condition of Flow | Demethanizer | | Depropanizer | |
|---|---|---|---|---|
| | 1[1] | 2[2] | 1[1] | 2[2] |
| Top Temp., °F | | −84 | | 129 |
| Btm. Temp., °F | | +6 | | 226 |
| Top Press., p.s.i.g | | | 290 | 275 |
| Bottom Press., p.s.i.g | 390 | 316 | | |
| Accumulator Temp., °F | | −146 | | 95 |
| Accumulator Pressure, p.s.i.g | | 314 | | 252 |
| Feed, Barrels | 480 | 565 | 1,060 | 1,180 |
| Bottoms, Barrels | | 457 | | 660 |
| Overhead,[3] Barrels (By Diff.) | | 107 | | 520 |

[1] Prior art practice.
[2] Practice of the invention.
[3] Reported as liquid, not including external reflux.

Although the invention has been described as applied to a tray type distillation column, the invention is also applicable to a packed column. In a packed column there is no liquid level maintained in the column and therefore a liquid level detector can be placed in the lower part of the column and when a liquid level is detected the column pressure can be reduced to correct the condition of flooding or the tendency to build up a flooded condition.

Conventional pressure control instruments are employed. The subtracting instrument 46 can be, for example, a Foxboro Adding Relay available from the Foxboro Company, Foxboro, Massachusetts.

In the event an incipient flooding condition occurs, the control instruments will lower the column pressure by preselected increments until normal distillation operations are obtained and the column will continue to operate at the new lower pressure. If it is desired to operate at a different pressure, it will be necessary to reset the controllers at the desired pressure.

Although the problem of flooding is more common than that of the trays becoming dry, the invention also provides a solution to the problem of an insufficient amount of liquid inventory in a distillation column. A liquid level detector can be installed in the lower portion of a downcomer and when the detector emits a signal indicating an insufficient amount of liquid in the downcomer the pressure controller can be set to provide an increase in the column pressure and thereby to raise the liquid level. Thus the controls can be set to maintain a liquid level in the downcomer within a predetermined range.

That which is claimed is:

1. The method of preventing flooding of a fractional distillation column which comprises
   (1) sensing the presence of a liquid level in said distillation column indicative of incipient flooding; and
   (2) reducing the pressure in the top of the column in accordance with said sensed liquid level by increasing the rate of overhead product withdrawal an amount sufficient to lower said liquid level to below the level that indicates incipient flooding.

2. The process of claim 1 wherein the overhead product of the distillation is a vapor and the column pressure is lowered by increasing the rate of vapor withdrawal.

3. The process of claim 1 wherein the overhead product of the distillation is a liquid and the column pressure is lowered by condensing a greater portion of the overhead vapors.

4. The method of claim 1 wherein the distillation column has trays, downcomer passageways communicating between the trays and a condenser to condense at least a portion of the overhead vapors and wherein the liquid level is sensed in a downcomer passageway.

5. In a distillation column having therein a plurality of trays, downcomers communicating between the trays, means for withdrawing overhead vapors, and means to condense at least a portion of the overhead vapors, the combination therewith comprising:

liquid level sensing means positioned in the upper portion of a downcomer to sense a level of liquid in said downcomer that indicates incipient flooding; and pressure control means operatively connected to said liquid level sensing means and to said means for withdrawing overhead vapors so as to lower the pressure in the top of said column when said liquid level sensing means senses said level of liquid in said downcomer.

6. The distillation column of claim 5 wherein, said means for withdrawing overhead vapors includes a conduit to remove uncondensed vapors as overhead product and a back pressure regulating valve in said conduit, and wherein the pressure control means is a pressure controller operatively connected to said liquid level sensing means and to said back pressure regulating valve to open said valve to lower the pressure on the column when said liquid level sensing means senses a level of liquid in said downcomer.

7. The distillation column of claim 5 wherein, said means for withdrawing overhead vapors includes a condenser, an accumulator, a first conduit containing a first back pressure regulating valve to pass a first portion of overhead vapors to said condenser and to pass condensate from said condenser to said accumulator, and a second conduit containing a second back pressure regulating valve to pass a second portion of overhead vapor directly to said accumulator, and wherein the pressure control means comprises a pressure controller operatively connected to said liquid level sensing means and to said first and second back pressure regulating valves so as to increase flow through said first conduit and decrease flow through said second conduit when said liquid level sensing means senses a liquid level in the downcomer which indicates incipient flooding.

References Cited

UNITED STATES PATENTS

| | | | |
|---|---|---|---|
| 2,467,951 | 4/1949 | Whitley | 202—181 |
| 2,915,462 | 12/1959 | Salmon | 203—2 |
| 3,130,027 | 4/1964 | Harper | 62—37 |
| 3,139,391 | 6/1964 | Walker | 196—132 |
| 3,208,230 | 9/1965 | Fourroux | 196—132 |
| 3,259,554 | 7/1966 | Constantikes | 62—21 |
| 3,322,136 | 5/1967 | Matta | 202—181 |

WILBUR L. BASCOMB, JR., *Primary Examiner.*

U.S. Cl. X.R.

203—2, 87; 202—160, 181, 162; 62—21; 196—132, 141